Patented Dec. 6, 1932

1,889,791

UNITED STATES PATENT OFFICE

WILHELM PUNGS, KARL EISENMANN, AND JOHANN KUCHENBUCH, OF LUDWIGSHAFEN-ON-THE-RHINE, GERMANY, ASSIGNORS TO I. G. FARBENINDUSTRIE AKTIENGESELL-SCHAFT, OF FRANKFORT-ON-THE-MAIN, GERMANY

PRODUCTION OF ARTIFICIAL RESINS

No Drawing. Application filed January 3, 1930, Serial No. 418,426, and in Germany January 15, 1929.

The present invention relates to improvements in the production of artificial resins.

Solutions of resinous condensation products of a urea, such as urea or derivatives of the same such as thiourea, methyl urea and the like, with formaldehyde, or polymers of the same, in organic solvents can be obtained for example by the condensation of urea and formaldehyde, or its polymers, in organic solvents, or by equivalently condensing mono- or di-methylol urea, or a methylol compound of thiourea, or the anhydrides of these methylol compounds, or mixtures of these materials, in the presence of an organic solvent. For various purposes it is desirable to free condensation products of a urea and formaldehyde to a great extent from volatile constituents contained in the reaction products. It has been already suggested to obtain this result by heating the dispersions of the condensation products and/or applying a vacuum, but these methods are defective because the condensation products are rather sensitive and considerably altered by the said treatments.

We have now found that the said condensation products can be entirely freed from solvents by subjecting the solutions of the condensation products containing the solvents, or solvent mixtures, to a steam distillation. When it is a question of removing solvents of high boiling point, for example benzyl alcohol, it is preferable to work with the conjoint employment of a vacuum and in some cases with moderately superheated steam. In this manner the condensation products are neither decomposed nor undesirably changed as regards their properties, such as waterproof nature or solubility in organic solvents.

After the solvent has been expelled in the manner described the condensation product is obtained as a hydrophobous gel, a part of the water contained in which is spontaneously expelled after a short period of time. The part of the water still remaining in the gel may be removed to the greater part by means of suitable operations such as kneading, pressing out or rolling the product. It is preferable to roll out the gel-like condensation product into bands of small thickness which very rapidly thoroughly dry throughout, and in this manner the product becomes as clear and hard as glass. In order to remove the last traces of water the product may be dried in vacuo, after pulverizing, preferably at moderately elevated temperatures, for example at from 50° to 60° C.

Solid condensation products are thus obtained which are entirely free from solvent and almost free from water and formaldehyde. They dissolve readily in many organic solvents even at room temperature. The condensation is preferably carried out in the presence of a small quantity of an acid reacting substance, such as hydrochloric oxalic or any other acid, urea nitrate, acid sodium sulphate or the like. In many cases it is advantageous to employ such acid reacting substances which are capable of maintaining a certain hydrogen ion concentration within the reaction mixture, for example a pH between about 6.5 and 2.0, as for example primary sodium phosphate, or a mixture thereof with secondary sodium phosphate, a mixture of sodium formate and formic acid or of sodium acetate and acetic acid, potassium tetroxalate or like so-called buffer substances. The condensation is preferably carried out by warming, since otherwise the process would require a too long period of time, a temperature between about 50° and 100° C. being usually chosen. If strongly acid agents have been employed it is advantageous to neutralize them after the condensation with the aid of any neutralizing agent which preferably should not be strong as caustic alkaline liquor for the sake of an easy and exact neutralization. As solvents may be mentioned for example organic compounds which contain one or more free hydroxyl groups, such as monohydric or polyhydric alcohols and their derivatives, and further higher ketones for example cyclohexanone, or aldehydes, for example furfurol or dioxane or its homologues, and ethers of high molecular weight, for example anisol, and acetals, for example dialkyl acetals and dialkyl methylals. The solid and especially the pulverized products obtained by the process in accordance with the present invention may be moulded under mechanical pressure at elevated temperatures and in compliance with all requirements, preferably with the addition of fillers, coloring materials, softening agents and the like, into clear homogeneous articles which as a particular advantage, do not exhibit the disastrous ageing phenomena, such as the formation of cracks which often occurs with urea formaldehyde condensation products which have been prepared otherwise.

It is possible to improve the properties of the condensation products as well as those of their solutions in different respects. The solutions or mixtures of these which are obtained directly after the condensation have a not inconsiderable content of free formaldehyde and water, which is undesirable for many purposes. Moreover it is necessary in order to obtain condensation products having particularly high water-proof properties suitable for the further working up into lacquers, artificial materials and the like, to carry out the condensation in certain solvents, for example higher aliphatic monohydric alcohols or aralkyl alcohols, which however have an undesirable smell and a volatility which is too small for many purposes. These drawbacks are avoided by working in accordance with the present invention which allows of obtaining solutions which only have a slight smell and which are practically free from formaldehyde and water by dissolving the solid condensation products obtained as hereinbefore described in solvents of great volatility, for example ethyl or propyl alcohol. Thus for example a 40 per cent solution of the urea-formaldehyde condensation product obtained by the condensation of dimethylol urea in the presence of a monohydric alcohol or of an ether of a polyhydric alcohol still containing at least one free hydroxyl group, and/or of a phenol with the aid of a small quantity of hydrochloric acid with the employment of butyl alcohol, contains about 2.5 per cent of free formaldehyde and about 7.5 per cent of water. On the contrary, a 40 per cent solution in ethyl alcohol of the solid condensation product obtained therefrom by the method hereinbefore described only contains 0.2 per cent of formaldehyde and 0.75 per cent of water. Solutions of this nature may be employed directly for the preparation of lacquer coatings. They leave behind clear very lustrous coatings which rapidly harden on the substrata. These solutions may also be blended with solvents in which the condensation products are only slightly soluble or are insoluble, for example esters or hydrocarbons, so that, if desired additional substances such as cellulose derivatives for example cellulose ethers, cellulose nitrate or cellulose carboxylates or natural or artificial resins, animal or vegetable oils, softening agents such as are employed in the manufacture of lacquers and varnishes such as camphor or camphor substitutes or mixtures of these substances may be dissolved in these mixtures.

By treatment with suitable, preferably readily volatile, organic solvents at room temperature or moderately elevated temperatures, the solid condensation products obtained in accordance with the present invention may be separated into two fractions, one fraction being colorless, glass-like and insoluble in the said solvents and the other fraction being colorless, viscous and soluble in the said solvents. The latter fraction is usually obtained in a yield of about from 15 to 20 per cent of the condensation product. As solvents suitable for this separation may be mentioned organic liquids which are free from hydroxyl groups and are the lower members of each class, i. e. have a low boiling point, for example ethyl ether, benzene, toluene and the like and organic esters and ketones of low molecular weight, for example methyl acetate or formate and acetone or its nearest homologues. The separation of the condensation products, which are preferably finely powdered and well dried, into the two fractions may be effected by extraction in any usual manner. The two fractions differ as regards their solubility in so far as the glass-like fraction only dissolves in those solvents in which the initial solid condensation product obtained after the steam distillation will also dissolve, that is to say for example in organic compounds which contain one or more hydroxyl groups such as monohydric or polyhydric alcohols or ethers of the latter so far as they contain at least one free hydroxyl group, and in higher ketones such as cyclohexanone, aldehydes such as furfurol, and higher ethers such as dioxane or its homologues, whereas the viscous fraction dissolves in practically all organic solvents, for example in esters, ethers, aliphatic or aromatic halogenated hydrocarbons, acetals, ketones, alcohols, liquid aromatic hydrocarbons and the like. The glass-like fraction may be worked up into the same products as the initial solid condensation product for example into lacquers, artificial materials, pressed and moulded articles and the like. The viscous fraction may be advantageously employed as a softening agent for cellulose derivatives, such as nitro or acetyl celluloses, or as an adhesive, for example for sticking together paper bands, wood, cork and the like.

The following examples will further illustrate the nature of this invention but the invention is not restricted to these examples. The parts are by weight except when otherwise specified.

*Example 1*

2000 parts of a 43 per cent solution in isobutyl alcohol of a condensation product prepared by the condensation of dimethylol urea in the presence of isobutyl alcohol and a small quantity of acid are subjected to a steam distillation at 100° C. The distillation is completed after a period of about 1 hour. The condensation product which remains in the reaction vessel as a watery gel is allowed to stand for some time, and a considerable part of the water contained in the product separates out spontaneously. The gel is separated from the water which has separated out and is rolled out into thin bands by means of suitable rollers and in this manner the major part of the residual water is pressed out. The mass is then passed on a conveyor belt through a drying chamber heated to a temperature of from about 50° to 60° C. The product dries rapidly and becomes as clear and hard as glass. It is then ground and if necessary dried in vacuo at moderately elevated temperatures such as from 50° to 60° C. The powdery product obtained may be dissolved in ethyl alcohol and worked up into a lacquer for example by incorporating it with nitrocellulose and a vegetable or animal oil, or oils of both kinds, which have been previously treated with air or oxygen and, if desired, with an organic solvent and/or a natural or artificial resin, or it may be pressed into clear articles at a temperature of about 100° C. and at a pressure of about 200 atmospheres.

Instead of a solution of a urea-formaldehyde condensation product in isobutyl alcohol, a solution in amyl alcohol or in benzyl alcohol may be employed. In the latter case it is preferable to carry out the steam distillation at a temperature gradually rising from 100° to 130° C. and under a vacuum of about 100 millimeters of mercury. In an analogous manner the urea-formaldehyde condensation product may be replaced by a similar condensation product from thiourea.

*Example 2*

2 kilograms of urea are dissolved at from 90° to 100° C. in 2 liters of commercial ethyl alcohol of about 96 per cent strength and 20 cubic centimeters of concentrated hydrochloric acid are added to the solution. This is then allowed to flow slowly into 11.5 liters of a solution of 20 per cent by volume of gaseous formaldehyde in amyl alcohol which has been heated to about 110° C. After the reaction is completed the clear solution is neutralized with 50 grams of tertiary sodium phosphate while stirring vigorously. The solution thus obtained is then freed from the organic solvent and dried as described in Example 1. The solid condensation product may be worked up into lacquers or pressed articles. The condensation product obtained in this manner is characterized by excellent water-proof properties.

*Example 3*

228 grams of dimethylol thiourea are introduced, while stirring, into 350 grams of normal butyl alcohol at 100° C. to which 20 cubic centimeters of a 5 per cent solution of urea nitrate in ethyl alcohol have previously been added. When the dimethylol thiourea has dissolved the solution is neutralized at 85° C. with 15 grams of tertiary sodium phosphate. The butyl alcohol is expelled from the solution obtained with steam at 60° C. with the employment of a vacuum of about from 60 to 70 millimeters of mercury. The residual watery gel is freed from adherent water in a suitable kneading machine under a vacuum of about 40 millimeters of mercury and at a temperature of 50° C. A glass-clear condensation product which is soft at room temperature is obtained. This may be worked up for example into lacquers which give coatings of a particularly high lustre and capable of being further hardened by heating without losing their gloss.

By employing a mixture of 120 grams of dimethylol urea and 135 grams of dimethylol thiourea instead of the 228 grams of dimethylol thiourea, in this example, a glass-clear product which is hard at room temperature is obtained which may be worked up in a manner analogous to the pure thiourea-formaldehyde condensation product.

*Example 4*

The solid condensation product obtained as described in Example 1 and which is preferably brought into the form of powder is stirred twice in a suitable apparatus with three times each its weight of ethyl ether or benzene at from 20° to 25° C. for a period of 1 hour each time, and the solvent is evaporated after separation of the undissolved material. A colorless viscous mass having great adhesive power is obtained in a yield of about 18 per cent calculated with reference to the initial product. The fraction which is insoluble in the ether or benzene may be pressed at a temperature of 100° C. and at a pressure of 200 atmospheres into clear, homogeneous, hard articles which exhibit no ageing phenomena, such as the formation of cracks.

In an analogous manner the solid urea-formaldehyde condensation product obtained as described in Example 2 may be separated into two fractions, one fraction being insoluble in ethyl ether or benzene and the other fraction being soluble therein. These two products behave in a similar manner to the two products obtained as already described in this example.

What we claim is:—

1. In the condensation of a urea and formaldehyde in the presence of an organic, hydroxyl-bearing solvent, the step which comprises treating the dispersion of the condensation product obtained, with steam.

2. In the condensation of a urea and formaldehyde in the presence of an organic, hydroxyl-bearing solvent, the step which comprises treating the dispersion of the condensation product obtained with slightly superheated steam.

3. In the condensation of a urea and formaldehyde in the presence of an organic, hydroxyl-bearing solvent, the step which comprises treating the dispersion of the condensation product obtained with steam, while applying a vacuum.

4. In the condensation of a urea and formaldehyde in the presence of an organic, hydroxyl-bearing solvent, the step which comprises treating the dispersion of the condensation products obtained with steam and then mechanically pressing the resulting product.

5. In the condensation of a urea and formaldehyde in the presence of an organic, hydroxyl-bearing solvent, the step which comprises treating the dispersion of the condensation products obtained with steam, drying the resulting product and subjecting it to fractional extraction with an organic solvent which is free from hydroxyl groups and is a low boiling member of its class.

6. In the condensation of urea, thiourea, and formaldehyde in the presence of an organic, hydroxyl-bearing solvent, the step which comprises treating the dispersion of the condensation products obtained with steam.

7. In the condensation of a urea and formaldehyde from a methylol-urea in the presence of an organic, hydroxyl-bearing solvent, the step which comprises treating the dispersion of the condensation products obtained with steam.

8. In the condensation of a urea and formaldehyde from a methylol-urea and a methylol thiourea in the presence of an organic, hydroxyl-bearing solvent, the step which comprises treating the dispersion of the condensation products obtained with steam.

9. In the condensation of a urea and formaldehyde in the presence of an aliphatic monohydric alcohol containing from 4 to 5 carbon atoms, the step which comprises treating the dispersion of the condensation product obtained with steam and then mechanically dehydrating the watery gel.

10. In the condensation of a urea and formaldehyde from a methylol-urea and a methylol thiourea in the presence of a hydroxyl-bearing organic solvent, the step which comprises treating the dispersion of the condensation product obtained with steam and then kneading the watery gel at about 50° centigrade, while applying a vacuum.

11. In the condensation of a urea and formaldehyde from a methylol-urea and a methylol thiourea in the presence of a hydroxyl-bearing organic solvent, the step which comprises treating the dispersion of the condensation product obtained with steam, drying the resulting product and subjecting it to fractional extraction with benzene.

In testimony whereof we have hereunto set our hands.

WILHELM PUNGS.
KARL EISENMANN.
JOHANN KUCHENBUCH.